(12) United States Patent
Trika et al.

(10) Patent No.: US 7,966,456 B2
(45) Date of Patent: Jun. 21, 2011

(54) METHOD FOR REDUCING NUMBER OF WRITES IN A CACHE MEMORY

(75) Inventors: Sanjeev N. Trika, Hillsboro, OR (US); Rick Mangold, Forest Grove, OR (US); Andrew Vogan, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 11/863,770

(22) Filed: Sep. 28, 2007

(65) Prior Publication Data

US 2009/0089508 A1  Apr. 2, 2009

(51) Int. Cl.
*G06F 12/00* (2006.01)
(52) U.S. Cl. .................. 711/135; 711/E12.026
(58) Field of Classification Search .......... None
See application file for complete search history.

(56) References Cited

U.S. PATENT DOCUMENTS 5,448,719 A * 9/1995 Schultz et al. .................. 714/5
2006/0047888 A1 * 3/2006 Nishihara et al. ............. 711/103

* cited by examiner

*Primary Examiner* — Reginald G Bragdon
*Assistant Examiner* — Hamdy S Ahmed
(74) *Attorney, Agent, or Firm* — Grossman, Tucker, Perreault & Pfleger, PLLC

(57) ABSTRACT

Disclosed is a method for reducing number of writes in a write-back non-volatile cache memory. The method comprises: writing a plurality of data in the cache memory, wherein cache lines meta data for each of the plurality of data is marked as dirty; determining a set of data of the plurality of the data in the cache memory to be flushed to a hard disk, wherein the hard disk is operatively coupled to the cache memory; flushing the set of data of the plurality of data to the hard disk from the cache memory; and writing a clean-marker to the cache memory specifying which of the plurality of the data has been flushed to the disk.

14 Claims, 1 Drawing Sheet

METHOD FOR REDUCING NUMBER OF WRITES IN A CACHE MEMORY

FIELD OF THE DISCLOSURE

The present disclosure relates to write back disk caching and, more particularly, to a method for reducing number of writes in a non-volatile cache memory.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

Figure 1:
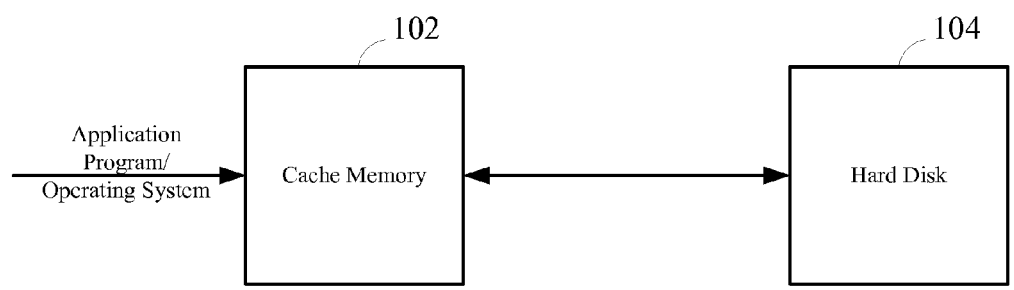
FIG. 1 is a block diagram illustrating a flow of data between a cache memory and a hard disk for reducing number of writes in the cache memory, according to an embodiment of the present disclosure.

For a thorough understanding of the present disclosure, reference is to be made to the following detailed description, including the appended claims, in connection with the above-described drawings. Although, the present disclosure is described in connection with exemplary embodiments, the disclosure is not intended to be limited to the specific forms set forth herein. It is understood that various omissions, substitutions of equivalents are contemplated as circumstances may suggest or render expedient, but is intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. As used herein, a "Volatile-Flush" may include a Flush command issued by an application or operating system (OS) that ensures that all previously written data is non-volatile. This command may require any volatile data to be written to a non-volatile media. "Disk-Flush" may include a Flush command issued to a disk drive by a cache controller to ensure that all previously written data to the disk drive is non-volatile. This command may require the disk-drive to write any volatile data in its write-buffers to non-volatile media. "Cache-Flush" refers to the process of writing dirty data from the cache to the disk, followed by a disk-flush, followed by marking the cache data as clean or unoccupied. This term is same as "CacheDirtyFlush". Note that typically the cache-flush requires N write operations to cache memory, one for every dirty cacheline, to mark each cacheline as clean or unoccupied. This invention reduces the number of cache writes in the cache-flush operation to F. F is the number of volatile flush operations issued by OS. F is much less than N.

The present disclosure provides a method for reducing number of writes in a cache memory. The method is described in conjunction with FIG. 1 illustrating the flow of data between a non-volatile cache memory 102 and a hard disk 104 for reducing number of writes in the non-volatile cache memory 102.

The method comprises writing a plurality of data in the cache memory 102 by a cache controller. Alternatively, or in addition, the plurality of data may be written on the cache memory 102 by an operating system, a software caching driver, or firmware operating the caching policies. The plurality of data written on the cache memory 102 is marked as "occupied" and "dirty" in cache lines meta data for each of the plurality of data.

Dirty data is later read from the cache and written to the disk to synchronize the cache and the disk. A "disk-flush" command is issued to the disk to ensure that any data in the disk's volatile buffers is saved non-volatilely. Once the disk-flush command has completed, the data that was written to the disk needs to be marked as "unoccupied" or "clean" in the cache lines meta data. This process of synchronizing the cache and the disk is called "cache-flush". The cache lines meta data is used for storing information about the plurality of data stored in the cache memory 102.

In the implementation of the said disclosure a reference variable may be used for marking the plurality of data, for example a "0" bit may signify "dirty" and "1" bit may signify "clean" in the cachelines' meta data. Since the cache lines meta data is used for identifying the plurality of data flushed to the hard disk 104 at any instant of time, the cache lines meta data can be used for recovering state of the hard disk 104 during a power failure.

In operation, a monotonically increasing sequence number may be written in the metadata section of the cacheline, for every cacheline write/update. Thus, every cacheline write has a unique sequence number. This may enable, for example, that a clean-marker is written to the cache memory that specifies that all cachelines which have a sequence number below the token value specified in the clean-marker should be considered clean. Accordingly, there may be no need to update multiple cachelines to be clean, but rather, the present methodology may write only a single clean-marker specifying that all cachelines up to a specific sequence number are clean.

The cache memory 102 may be a platform based NAND cache memory. In a platform based non-volatile cache implementation the set of data may be written from the cache memory 102 to the hard disk 104 in a same sequence order as it was written in the cache memory 102. The same sequence order is maintained by assigning a sequence number to each of the plurality of data and flushing the plurality of data according to the sequence number assigned to each of the plurality of data. A variable at any particular instant of time may specify a sequence number of a data of the plurality of data up to which the plurality of data is currently flushed to the hard disk 104 at that particular instant of time.

The method further comprises determining by the cache memory 102, a set of data of the plurality of data that is to be written to the hard disk 104. The operating system issues a Volatile-Flush command for ensuring that previously written data or plurality of data to the disk subsystem is made non-volatile.

In another implementation of a non-volatile cache, writes may be issued to the disk in any order. The variable in the cache is always maintained to be the sequence number upto which all cachelines are clean. Thus, all cachelines that have a sequence number below the value of this variable are implied to be clean.

In yet another implementation of a non-volatile cache, the writes issued to the disk may be re-ordered within volatile-flush boundaries. For example, consider a scenario where the operating system writes a set of data $A_1, A_2, A_3, \ldots, A_a$ and issues a volatile-flush command, and then writes another set of data $B_1, B_2, B_3, \ldots, B_b$, followed by another volatile-flush command, and these writes are inserted "dirty" in the cache memory 102 with sequence numbers $S_1, S_2, S_3, \ldots, S_{a+b}$. At a later time, cache lines corresponding to the set of data $A_1, A_2, A_3, \ldots, A_a$ are written to the hard disk 104 in arbitrary order. Before $B_1, B_2, B_3, \ldots, B_b$ are written out to the disk, a disk-flush is completed, and the clean marker variable in the non-volatile cache memory is updated to sequence number $S_a$. "Thereafter", when cache lines corresponding to $B_1, B_2, B_3, \ldots, B_b$ are written in arbitrary order to the hard disk 104, another disk-flush is completed and the clean marker in the non-volatile cache memory is updated with sequence number $S_{a+b}$.

Further, the variable is used for identifying the "dirty" cache lines meta data corresponding to the plurality of data that is not flushed to the hard disk 104 in case of power failure. For example, consider the scenario that in addition to writing the set of data $A_1, A_2, A_3, \ldots, A_a$, Volatile-Flush, writing the set of data $B_1, B_2, B_3, \ldots, B_b$, and another Volatile-Flush, the operating system or the application issues writing of another set of data $C_1, C_2, C_3 \ldots C_c$, and these writes are inserted "dirty" in the cache memory 102 with sequence numbers $S_{a+b+1}, S_{a+b+2}, \ldots, S_{a+b+c}$. However, in case of a power failure, where only data $C_1, C_2$ are written to the hard disk 104 and data $C_3 \ldots C_c$ is not written to the hard disk 104, the cache memory 102 checks the variable and determines that all cache lines with meta data with sequence number below $S_{a+b}$ are clean. It should be noted that cachelines with metadata sequence number above the clean marker variable value may be clean or dirty. The variable has a value $S_{a+b}$ that specifies that the set of data $A_1, A_2, A_3, \ldots, A_a, B_1, B_2, B_3, \ldots, B_b$ is clean and the set of data $C_1, C_2, C_3 \ldots C_c$ may not be on the hard disk 104. Hence, cachelines with sequence number above $S_{a+b}$ will be flushed to the hard disk 104 during the recovery from the power failure.

A run-time algorithm for reducing number of writes in the cache memory 102 is described below with particular reference to pseudo codes.

In one embodiment of the disclosure, a function Disksubsystemwrite ( ) is used for reducing number of writes in the cache memory 102. The function Disksubsystemwrite ( ) is described in the following pseudo code.

```
Disksubsystemwrite (LBA X, Data D)
    If (X should be inserted in the cache) then
        Identify location L in the cache where D should be stored.
        Add D to the cache at location L, with meta data including valid,
        dirty, X and S information.
        Update the hash table so that X points to L.
        Increment S
        Add L to the end of ToBeFlushed list.
    Else
        CacheDirtyFlush ( )
        Write D to the cached disk at address X
    End if
```

The decision regarding writing data is usually controlled by the application program or the operating system. This data is referred with reference to a character D in the pseudo code. It may then determine whether a data of the plurality of data is to be written on the cache memory 102. If the data of the plurality of data is to be written on the cache memory 102, then a location in the cache memory 102 is identified for storing the data. The location is referred with reference to a character L in the pseudo code.

The data is written in the location L along with a cache line meta data corresponding to the data D. Further, a hash table is updated, so that the location of the data in the hash table is updated and points to L. The hash table is used for maintaining a record of locations of the data in the cache memory. Thereafter, the sequence number represented by character S is incremented by one. Next, the location of data is added to a ToBeFlushed list. The ToBeFlushed list comprises locations in cache of the plurality of data that is to be written to the hard disk 104. Otherwise, in case of the data of the plurality of data not to be written on the cache memory 102, a cachedirtyflush ( ) function is called.

A function DiskSubsystemFlush is called by the OS to ensure that writes pending in any volatile buffer are committed non-volatilely. This is the Volatile-Flush call issued by application and/or OS.

The function DiskSubsystemFlush is described in the following pseudo code.

```
DiskSubsystemFlush ( )
    Let CleanMarker.token = S
    Add clean-marker to the end of list of the ToBeFlushed data.
```

The sequence number of the last dirty data written to the cache is added to the list of the plurality of data that is to be flushed to the hard disk 104.

The function Cachedirtyflush ( ) is described in the following pseudo code.

```
Cachedirtyflush ( )
    For each element L in the list of ToBeFlushed data, process in order:
        If L is a cacheline address
            Read data D and meta data M at cache location L
            Write D to disk at LBA specified in M
            Remove L from the list of ToBeFlushed data.
        Else
            Complete a Disk-Flush
            Let CleanMarker.token =L.token
            Write CleanMarker to the cache to any empty location in the cache
        End if
```

The cachedirtyflush ( ) function may be called if any data of the plurality of data is not to be written on the cache memory 102 and is also called in case the dirty data is to be written to the disk 104. The data in the ToBeFlushed list is checked and if the data D is to be written to the hard disk 104, then the data D is read from the location L and written to the hard disk 104. Referring to the pseudo-code above, the ToBeFlushed list contains two types of elements: data that needs to be flushed (the element L is a cacheline address), and clean-markers. Thus, the else statement in this pseudo-code refers to the case where L is a clean-marker. Otherwise, if L is a clean-marker, then a disk-flush is completed and the variable in non-volatile cache memory 102 is updated to specify the sequence number stored in the clean-marker L Existing systems require 2N writes to the cache memory 102 for a plurality of data N, where N is the number of dirty cachelines inserted into the non-volatile cache 102. More specifically, N writes are required for inserting "dirty" or "occupied" cache lines meta data for each of the plurality of data N, and further N writes are required to mark the cache lines meta data as "clean" for each of the plurality of data N.

The present disclosure reduces number of writes in the cache memory 102 to N+F, where F is the number of variable updates done as clean-marker writes in the non-volatile cache 102. In one embodiment, the number of variable updates done in the non-volatile cache 102 equals the number of volatile-flush commands issued by the operating system or application. Accordingly, the total number of writes is N+F. Since F is usually much smaller than N, the present disclosure reduces the number of writes in the non-volatile write-back cache memory 102 by roughly 50%, thereby improving performance and lifetime of the cache memory 102.

The use of variable to mark the cache line meta data as provided by the method of the disclosure, eliminates the second write required for marking the cache lines meta data as "clean" when the set of data is written to the hard disk 104.

As described above, the embodiments of the disclosure may be embodied in the form of computer-implemented processes and apparatuses for practicing the processes. Embodiments of the disclosure may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present disclosure.

What is claimed is:

1. A method for reducing number of writes in a cache memory, the method comprising:
   writing a plurality of data in the cache memory, wherein cache lines meta data for each of the plurality of data is marked as dirty;
   determining a set of data of the plurality of the data in the cache memory to be flushed to a hard disk, wherein the hard disk is operatively coupled to the cache memory;
   flushing the set of data of the plurality of data to the hard disk from the cache memory; and
   writing a clean-marker to a cache line of each of the set of data specifying which of the plurality of the data has been flushed to the disk; wherein the clean marker is a monotonically increasing sequence number that specifies that all cache lines which have a sequence number below a selected clean marker are clean.

2. The method of claim 1, wherein a variable is used for identifying data pending to be flushed to the hard disk in case of power failure.

3. The method of claim 1, wherein the cache memory is a NAND memory.

4. The method of claim 1, wherein the clean-marker writes to cache follow the flushing the set of data of the plurality of data to the hard disk from the cache memory.

5. The method of claim 1, wherein disk-flushes are ordered among disk-writes in same relative order as writes to a disk and flushes issued by an operating system.

6. The method of claim 5, wherein the writes to disk between disk-flushes are issued in arbitrary order.

7. The method of claim 1, wherein ordering information of received flushes is saved in the cache memory.

8. A computer program product embodied on a computer readable storage medium for reducing number of writes in a cache memory, the computer program product comprising a program module having instructions for:
   writing a plurality of data in the cache memory, wherein cache lines meta data for each of the plurality of data is marked as dirty;
   determining a set of data of the plurality of the data in the cache memory to be flushed to a hard disk, wherein the hard disk is operatively coupled to the cache memory;
   flushing the set of data of the plurality of data to the hard disk from the cache memory; and
   writing a clean-marker to a cache line of each of the set of data specifying which of the plurality of the data has been flushed to the disk; wherein the clean marker is a monotonically increasing sequence number that specifies that all cache lines which have a sequence number below a selected clean marker are clean.

9. The computer program product of claim 8, wherein a variable is used for identifying data flushed to the hard disk in case of power failure.

10. The computer program product of claim 8, wherein the cache memory is a NAND memory.

11. The computer program product of claim 8, wherein the clean-marker writes to cache follow the flushing the set of data of the plurality of data to the hard disk from the cache memory.

12. The computer program product of claim 8, wherein disk-flushes are ordered among disk-writes in same relative order as writes and flushes issued by an operating system.

13. The computer program product of claim 12, wherein the writes to disk between disk-flushes are issued in arbitrary order.

14. The computer program product of claim 8, wherein ordering information of received flushes is saved in the cache memory.

* * * * *